(12) United States Patent
Sato (10) Patent No.: US 11,695,617 B2
(45) Date of Patent: Jul. 4, 2023

(54) ALARM MONITORING SYSTEM, ALARM MONITORING METHOD, AND PROGRAM

(71) Applicant: Nippon Telegraph and Telephone Corporation, Tokyo (JP)

(72) Inventor: Ryosuke Sato, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/795,102

(22) PCT Filed: Feb. 5, 2020

(86) PCT No.: PCT/JP2020/004356
§ 371 (c)(1),
(2) Date: Jul. 25, 2022

(87) PCT Pub. No.: WO2021/156971
PCT Pub. Date: Aug. 12, 2021

(65) Prior Publication Data
US 2023/0086040 A1 Mar. 23, 2023

(51) Int. Cl.
*H04L 41/0604* (2022.01)
*H04L 41/085* (2022.01)

(52) U.S. Cl.
CPC ........ *H04L 41/0613* (2013.01); *H04L 41/085* (2013.01)

(58) Field of Classification Search
CPC ........................... H04L 41/0613; H04L 41/085
USPC ....................................................... 709/224
See application file for complete search history.

(56) References Cited

U.S. PATENT DOCUMENTS

| 7,231,415 | B1* | 6/2007 | Eslambolchi | H04L 41/22 709/200 |
| 7,603,458 | B1* | 10/2009 | Sexton | H04L 41/0681 709/224 |
| 8,955,122 | B2* | 2/2015 | Gu | G06F 21/566 702/78 |
| 9,417,949 | B1* | 8/2016 | Bray | H04L 41/065 |
| 11,381,586 | B2* | 7/2022 | Chakravarty | H04W 12/122 |
| 11,601,326 | B1* | 3/2023 | Kolev | H04L 41/0613 |
| 11,601,476 | B2* | 3/2023 | Chamarajnagar | H04L 65/104 |

(Continued)

FOREIGN PATENT DOCUMENTS

JP 2018-028778 2/2018

*Primary Examiner* — Tauqir Hussain
(74) *Attorney, Agent, or Firm* — Fish & Richardson P.C.

(57) ABSTRACT

A warning monitoring system includes: a warning information generation unit configured to receive a warning and a ripple warning generated due to the warning, each including a device name and sent by a device configuring a network, determine respective types of the warning and the ripple warning based on messages included in the warning and the ripple warning, and generate warning information in which the warning and the ripple warning are associated with the types; a network configuration database in which configuration information about the network is accumulated; and an interrelation analysis unit including a prior rule that indicates a generation manner of the ripple warning different depending on the type, and configured to acquire specific connection destination information by searching the network configuration database by using target information defined by the prior rule and the device name as keys, and relate the warning and the ripple warning.

12 Claims, 11 Drawing Sheets

(56) References Cited

U.S. PATENT DOCUMENTS

| | | | |
|---|---|---|---|
| 11,601,508 B2* | 3/2023 | Du | H04L 49/3009 |
| 2005/0044406 A1* | 2/2005 | Stute | C12Q 1/6804 |
| | | | 713/153 |
| 2005/0050378 A1* | 3/2005 | Liang | H04L 63/1408 |
| | | | 714/4.11 |
| 2009/0313624 A1* | 12/2009 | Duffy | G06F 9/466 |
| | | | 718/100 |
| 2012/0072160 A1* | 3/2012 | Machii | H04L 41/069 |
| | | | 702/127 |
| 2012/0116838 A1* | 5/2012 | Bisdikian | G06Q 10/0635 |
| | | | 709/224 |
| 2014/0214343 A1* | 7/2014 | Bengtsson | H02M 7/066 |
| | | | 702/58 |
| 2018/0102955 A1* | 4/2018 | Jones-McFadden | |
| | | | H04L 67/535 |
| 2018/0139113 A1* | 5/2018 | Jhu | H04L 12/437 |
| 2019/0215230 A1* | 7/2019 | Mermoud | H04L 41/16 |
| 2020/0022002 A1* | 1/2020 | Karanam | H04M 3/2236 |
| 2020/0249277 A1* | 8/2020 | Richter | G01R 19/16576 |
| 2020/0412758 A1* | 12/2020 | Trivellato | H04L 63/1441 |
| 2021/0028975 A1* | 1/2021 | Mortensen | H04L 41/064 |
| 2021/0203673 A1* | 7/2021 | dos Santos | H04L 41/0609 |

* cited by examiner

| DEVICE NAME | MESSAGE |
|---|---|
| Host_A | EQP, device fault, ⋯ |
| Host_A | LOC |
| Host_B | Port ½ linkdown |
| Host_B | LOC |

| TYPE OF WARNING INFORMATION | PRIOR RULE |
|---|---|
| DEVICE MAIN BODY BREAKDOWN | RIPPLE WARNING "linkdown" IS GENERATED FROM DEVICE THAT IS PHYSICAL CONNECTION DESTINATION |
| UNIT BREAKDOWN | |
| PHYSICAL LINK BREAKDOWN | RIPPLE WARNING "linkdown" IS GENERATED FROM DEVICE THAT IS PHYSICAL CONNECTION DESTINATION |
| LOGICAL LINK BREAKDOWN | RIPPLE WARNING "LOC" IS GENERATED FROM DEVICE THAT IS LOGICAL CONNECTION DESTINATION |
| ⋮ | ⋮ |

Fig. 5

| HOST NAME | TARGET INFORMATION | DATA |
|---|---|---|
| Host_A | PHYSICAL CONNECTION DESTINATION | Host_B, Slot:1, Port:2 |
| Host_A | LOGICAL LINK BREAKDOWN | Host_B |
| ⋮ | ⋮ | ⋮ |

IP LAYER (b)

| RECEIVING ORDER | DEVICE NAME | MESSAGE | BREAKDOWN EVENT id/MAIN-CAUSE |
|---|---|---|---|
| 1 | Host_A | EQP (MAIN BODY BREAKDOWN) | 1/MAIN-CAUSE |
| 2 | ... | ... | |
| 3 | Host_B | Port 1/1 linkdown | 1/RIPPLE |
| 4 | ... | ... | |
| 5 | Host_E | Port 1/2 linkdown | 2/UNDETERMINED |
| 6 | Host_C | Port 1/2 linkdown | 1/RIPPLE |
| 7 | ... | ... | |
| 8 | ... | ... | |
| 9 | Host_D | Port 1/1 linkdown | 2/UNDETERMINED |
| 10 | ... | ... | |

Fig. 11

ALARM MONITORING SYSTEM, ALARM MONITORING METHOD, AND PROGRAM

CROSS-REFERENCE TO RELATED APPLICATIONS

This application is a National Stage application under 35 U.S.C. § 371 of International Application No. PCT/JP2020/004356, having an International Filing Date of Feb. 5, 2020. The disclosure of the prior application is considered part of the disclosure of this application, and is incorporated by reference in its entirety into this application.

TECHNICAL FIELD

The present invention relates to a warning monitoring system that monitors the operation of network devices, a warning monitoring method, and a program.

BACKGROUND ART

In monitoring of the operation of network devices, when a device breaks down, a warning (main-cause alarm) is sent from the broken device. In addition to the warning, many relevant warnings (ripple alarms) are sent from devices around the broken device in the network, in a ripple manner. Generally, the warning is sometimes referred to as an alarm, but herein, the term "warning" is consistently used.

At the time of response to breakdown, it is often necessary to cope with the warning sent from the broken device. That is, it is necessary to exclude ripple warnings in relation to the corresponding warning, but it is necessary for the operator to have a high experiential skill for distinguishing the target warning from many warnings.

For the purpose of supporting the work to distinguish the warning, there have been considered a rule-based technique of previously defining a determination rule for relating between warnings, a statistics-based technique of learning generation patterns of past warnings, a technique of automatically generating a determination rule based on learning results (for example, Patent Literature 1), and the like.

CITATION LIST

Patent Literature

Patent Literature 1: Japanese Patent Laid-Open No. 2018-28778

SUMMARY OF THE INVENTION

Technical Problem

However, there is a problem in that the statistics-based and the generated determination rule easily become black boxes. Further, in the rule-based technique, a co-occurrence relation between warnings at the time of breakdown is previously defined in the rule, and at the time of receiving a warning, related warnings are searched for in accordance with the rule. Therefore, there is a problem in that it is not possible to define a flexible rule, and to accurately distinguish ripple warnings. As a result, there is a problem to solve in that the accuracy of the distinction of warnings is low and the ground of the distinction cannot be explained even when the explanation is demanded.

The present invention has been made in view of the problem, and has an object to provide a warning monitoring system, a warning monitoring method and a program that make it possible to accurately distinguish a target warning to be coped with even when the operator does not have a high experiential skill, and to explain the ground of the distinction.

Means for Solving the Problem

As a gist, a warning monitoring system according to an aspect of the present invention includes: a warning information generation unit configured to receive a warning and a ripple warning generated due to the warning, each including a device name and sent by a device configuring a network, determine respective types of the warning and the ripple warning based on messages included in the warning and the ripple warning, and generate warning information in which the warning and the ripple warning are associated with the types; a network configuration database in which configuration information about the network is accumulated; and an interrelation analysis unit including a prior rule that indicates a generation manner of the ripple warning different depending on the type, and configured to acquire specific connection destination information by searching the network configuration database by using target information defined by the prior rule and the device name as keys, and relate the warning and the ripple warning.

As a gist, a warning monitoring method according to an aspect of the present invention is a warning monitoring method that is performed by the above warning monitoring system, the warning monitoring method including: a warning information generation step of receiving a warning and a ripple warning generated due to the warning, each including a device name and sent by a device configuring a network, determining respective types of the warning and the ripple warning based on messages included in the warning and the ripple warning, and generating warning information in which the warning and the ripple warning are associated with the types; and an interrelation analysis step of including a prior rule that indicates a generation manner of the ripple warning different depending on the type, acquiring specific connection destination information by searching a network configuration database in which configuration information about the network is accumulated, by using target information defined by the prior rule and the device name as keys, and relating the warning and the ripple warning.

As a gist, a program according to an aspect of the present invention is a program that causes a computer to function as the above warning monitoring system.

Effects of the Invention

With the present invention, it is possible to accurately distinguish the target warning to be coped with even when the operator does not have a high experiential skill. Further, it is possible to easily explain the ground of the distinction because of relating the target warning to be coped with and the ripple warning.

DESCRIPTION OF EMBODIMENTS

An embodiment of the present invention will be explained below with use of the drawings. Among a plurality of drawings, identical elements are denoted by identical reference characters, and explanations for them are not repeated.

Figure 1:
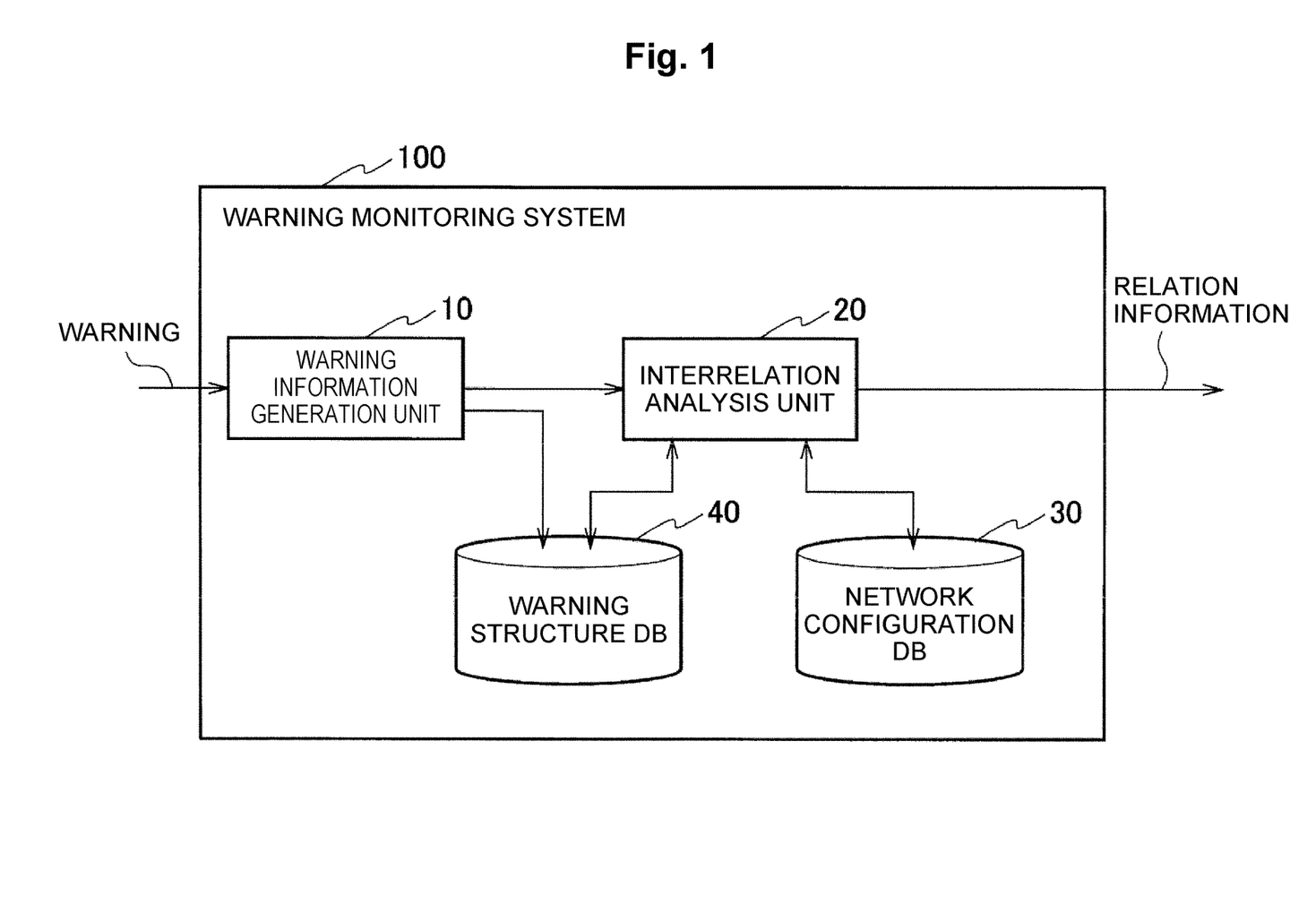
FIG. 1 is a block diagram showing an exemplary functional configuration of a warning monitoring system according to an embodiment of the present invention.

FIG. 1 is a block diagram showing an exemplary functional configuration of a warning monitoring system according to an embodiment of the present invention. A warning monitoring system 100 shown in FIG. 1 is a system that is connected with devices (not illustrated) configuring a network through control lines, that monitors warnings from the devices, and that relates a target warning to be coped with and a ripple warning other than the target warning to be coped with.

The warning monitoring system 100 includes a warning information generation unit 10, an interrelation analysis unit 20, a network configuration database 30 and a warning structure database 40. Hereinafter, the database is represented as DB.

Figure 2:
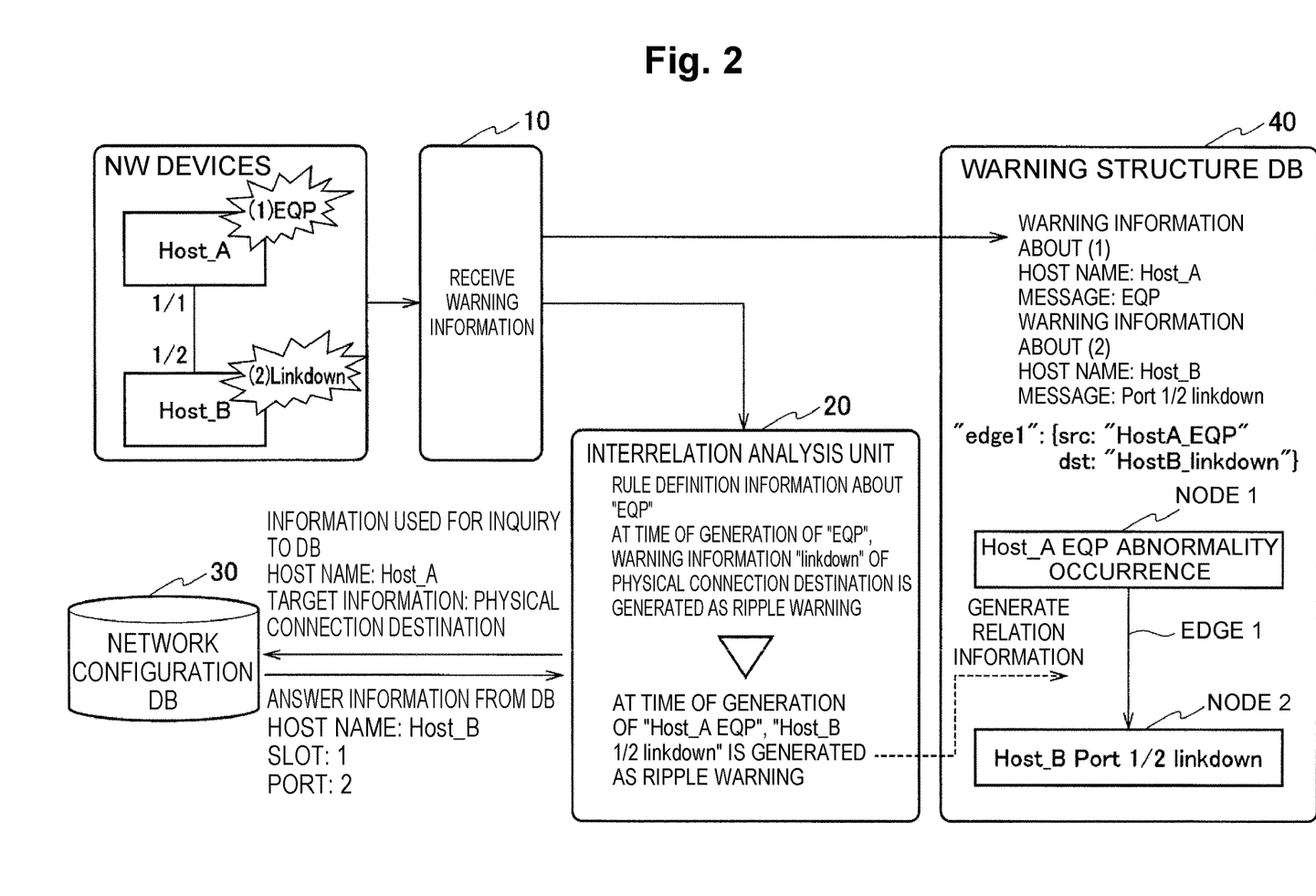
FIG. 2 is a behavior explanation diagram for explaining an exemplary behavior of the warning monitoring system shown in FIG. 1.

FIG. 2 is a behavior explanation diagram for explaining an exemplary behavior of the warning monitoring system 100. FIG. 2 is a diagram in which a flow of main information is described on the block diagram shown in FIG. 1. With reference to FIG. 2 and other drawings, an exemplary behavior in which the warning monitoring system 100 relates a warning that is necessary to be coped with and a ripple warning (secondary) that is generated in a ripple manner due to the warning (primary) will be explained.

Example of Relating

The warning information generation unit 10 receives warning from the devices configuring the network. FIG. 2 schematically shows an example in which a warning "EQP" indicating the breakdown of Host_A (device) is generated and thereafter a ripple warning "linkdown" is generated in Host_B (device) due to the warning "EQP".

The warning information generation unit 10 receives the warnings and generates warning information. For example, the warnings include device names for identifying the respective devices that have sent the warning "EQP" and the ripple warning "linkdown", and messages indicating the types of the warning "EQP" and the ripple warning "linkdown". The warning information generation unit 10 records the received warnings in the warning structure DB 40. The recorded "EQP" and "Port 1/2 linkdown" are shown within the warning structure DB 40 in FIG. 2.

Figure 3:
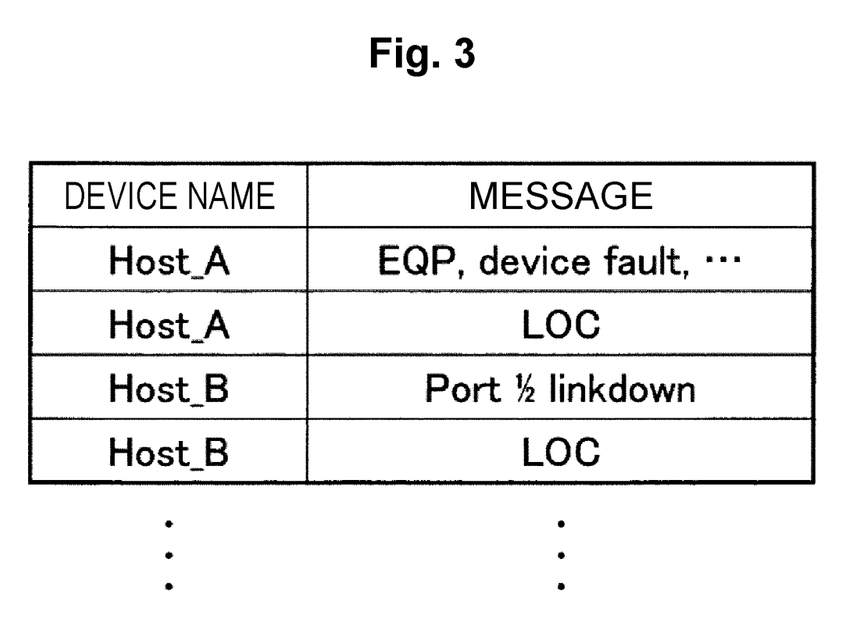
FIG. 3 is a diagram showing an exemplary configuration of warnings.

FIG. 3 is a diagram showing an exemplary configuration of the warnings. The first column from the left indicates the device names, and the second column indicates the messages. The first line indicates the warning "EQP" sent by Host_A. The third line indicates the warning "linkdown" sent by Host_B. The character string of a message is different depending on the vendor of the device.

The warning information generation unit 10 recognizes the character string of the message included in the warning, and determines the type of the warning. The type of the warning is device main body breakdown, unit breakdown, physical link breakdown, logical link breakdown, or the like.

The warning information generation unit 10 outputs warning information in which the warning is associated with the determined type, to the interrelation analysis unit 20. On that occasion, the warning information may be recorded in the warning structure DB 40.

The interrelation analysis unit 20 includes a prior rule indicating a generation manner of the ripple warning that is different depending on the type, and acquires specific connection destination information by searching the network configuration DB 30 by using target information defined by the prior rule and the device name as keys. Then, the warning and the ripple warning are related. The prior rule is previously set by a person. In the case of acquiring a device that is the connection destination of a particular port of the device, or in other cases, a port number or the like may be used as an additional search parameter, in addition to the device name.

Figure 4:
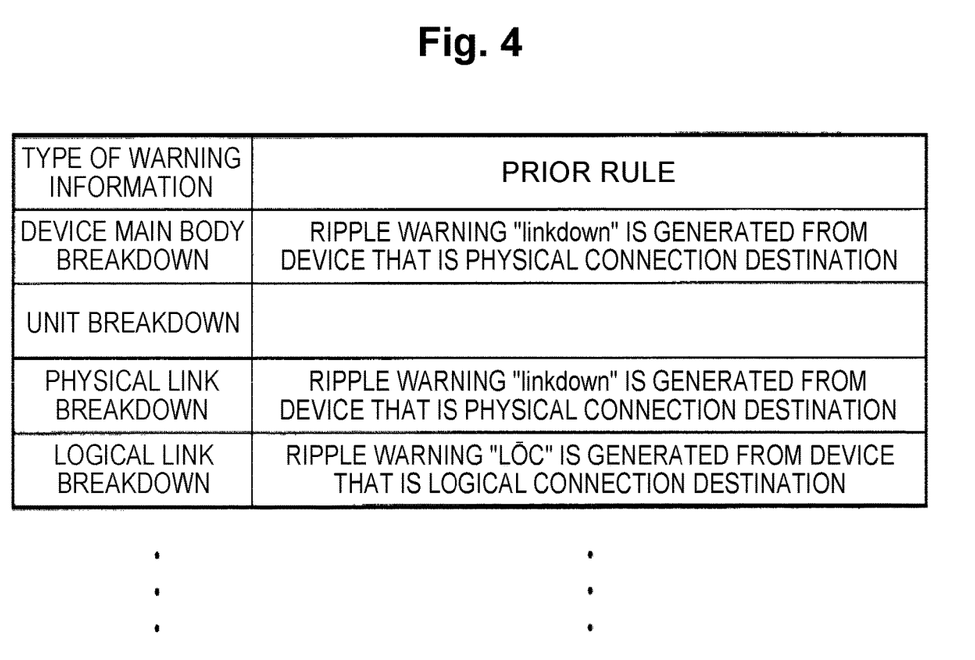
FIG. 4 is a diagram showing an example of a prior rule included in an interrelation analysis unit shown in FIG. 1.

FIG. 4 shows an example of the prior rule. The first column from the left in FIG. 4 indicates the type of the device breakdown, and the second column indicates the prior rule corresponding to the type. As shown in FIG. 4, the prior rule corresponds to the type of the warning, and expresses the generation manner of the ripple warning that is different depending on the warning.

In the warning information generation unit 10, from the message, it is determined that the warning "EQP" indicates the device main body breakdown (the second line from the top in FIG. 3). The prior rule in the case of device main body breakdown is "a ripple warning "linkdown" is generated from a device that is a physical connection destination". The prior rule in the case of physical link breakdown is "a ripple warning "linkdown" is generated from a device that is a physical connection destination". The prior rule in the case of logical link breakdown is "a ripple warning "LOC" is generated from a device that is a logical connection destination".

The target information indicates a key for searching the network configuration DB 30, and is information that is different depending on the target to be searched for. For example, the target information in the case of searching for a physical connection destination is "physical connection destination". The target information in the case of searching for a logical connection destination is "logical connection destination".

The interrelation analysis unit 20 acquires specific connection destination information by searching the network configuration DB 30 using the target information (physical connection destination in this case) defined by the prior rule and the device name (Host_A in this case) as keys. As a search key, a device unit name can also be used. The same applies hereafter.

Figure 5:
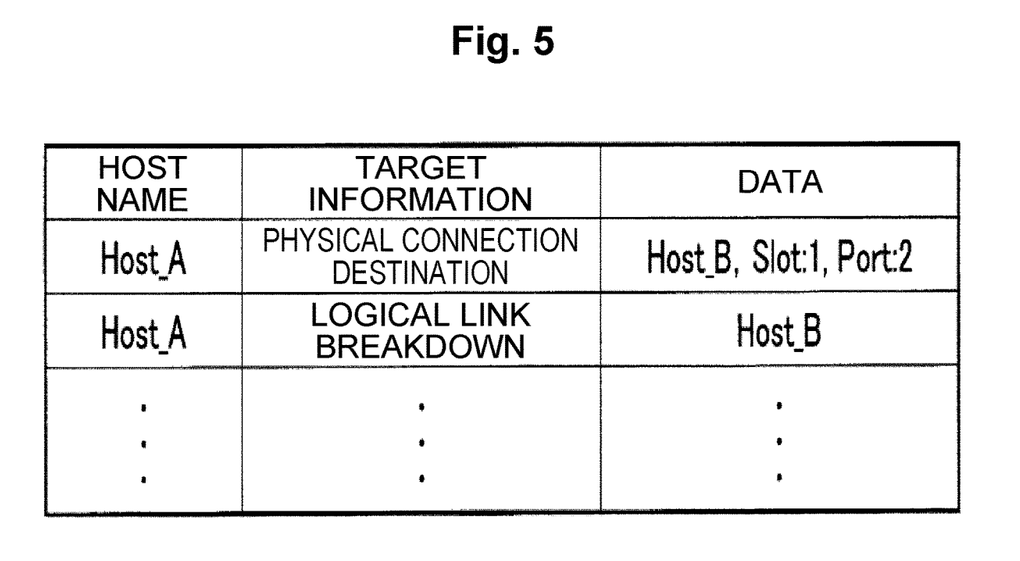
FIG. 5 is a diagram schematically showing examples of records of a network configuration DB shown in FIG. 1.

FIG. 5 is a diagram showing examples of records of the network configuration DB 30. The first column (device name) and second column (target information) from the left in FIG. 5 are search keys. The third column is data searched for with the search keys.

When the network configuration DB 30 is searched using the device name (Host_A) and the physical connection destination as keys, connection destination information indicating "Host_B, slot 1 port 2" is obtained. Consequently, according to the prior rule, a ripple warning "linkdown" is generated from the connection destination.

In the case where the warning information generation unit 10 receives a ripple warning "linkdown" or has already received a ripple warning "linkdown", the interrelation analysis unit 20 relates the warning "EQP" (Host_A in this case) causing the ripple warning "linkdown" and the ripple warning "linkdown". For example, the relating is performed by expressing the relating as a data structure in which the warnings are expressed as nodes and the respective nodes are connected by an edge.

Relation information indicating the relation between the warning and the ripple warning may be recorded in the warning structure DB 30. An example of the relation information is shown within the warning structure DB 40 shown in FIG. 2.

In the relation information exemplified in FIG. 2, the warning "EQP" (Host_A, EQP) is set as a node 1, the ripple warning "linkdown" (Host_B Port 1/2 linkdown) is set as a node 2, and the node 1 and the node 2 are connected by an edge 1. The edge 1 has a direction, and is expressed as a character string that starts with "edge 1" shown in FIG. 2, for example. "Src" indicates a warning that is a main cause generating a ripple warning, and "dst" indicates a ripple warning that is generated due to the warning (main cause).

In this way, the relation information between a warning and a ripple warning is expressed as nodes expressing the warning and the ripple warning respectively and an edge connecting the nodes. This facilitates the distinction between a warning that is a main cause and a ripple warning other than the warning.

Another Example of Relating

The relating between a warning and a ripple warning is not limited to relating relevant to physical connection between devices. For example, the relating can be performed for logical connection.

Figure 6:
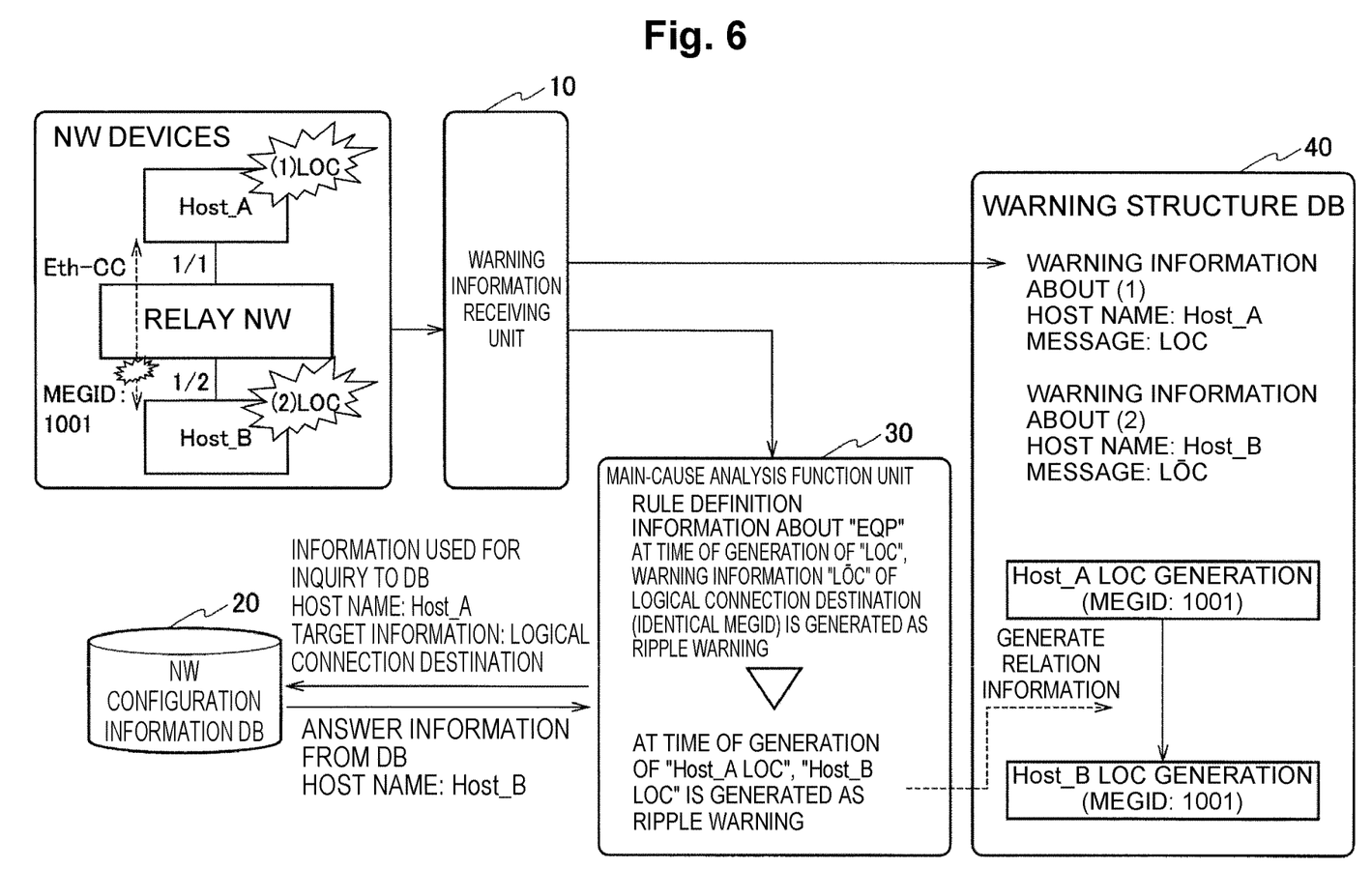
FIG. 6 is a behavior explanation diagram for explaining another exemplary behavior of the warning monitoring system shown in FIG. 1.

FIG. 6 shows a case where two devices are logically connected through a relay device and where a warning "LOC" meaning a communication disconnection is generated in Host_A due to the breakdown of the relay device or a communication line and subsequently a warning "LOC" is generated in Host_B that is a logical connection destination.

The warning information generation unit 10 recognizes a character string (LOC) in a message included in the warning "LOC" generated in Host_A, and determines the type of the warning. In this case, the determined type is "logical link breakdown". The warning information including the determined type is recorded in the warning structure DB 40.

The interrelation analysis unit 20 accepts the input of the warning information including the type determined by the warning information generation unit 10, and refers to the prior rule corresponding to the type. The prior rule in the case of logical link breakdown is "a ripple warning "LOC" is generated from a device that is a logical connection destination".

In this case, the interrelation analysis unit 20 searches the network configuration DB 30 using "Host_A" and "logical connection destination" as keys. In the network configuration DB 30, Host_B is recorded as the logical connection destination of Host_A.

The interrelation analysis unit 20 acquires Host_B as specific connection destination information in this case. Thereafter, when the warning information generation unit 10 receives a ripple warning "LOC", the warning information generation unit 10 relates the ripple warning "LOC" and the warning "LOC" (Host_A in this case) causing the ripple warning "LOC".

The relating between LOCs is performed by connecting two nodes by a bidirectional arrow. The warning "LOC" received from Host_A by the warning information generation unit 10 is a ripple warning generated due to the breakdown of the relay device. Further, the warning "LOC" subsequently received from Host_B is also a ripple warning.

In this way, in the case where the type of the warning is physical link breakdown, logical link breakdown or the like, the other of the two warnings is distinguished as a ripple warning, and as a result, the two warnings are related by a bidirectional arrow. The order of warnings that are received by the warning information generation unit 10 is not limited to the order of Host_A→Host_B. The order can be reversed depending on the communication situation of the network.

The turnover of the order of warnings received by the warning information generation unit 10 is also applied to the case of the combination of a main-cause warning and a ripple warning. In some cases, first, a warning "linkdown" is received, and thereafter, a warning "EQP" is received.

In the case of receiving a warning "linkdown", the warning information generation unit 10 determines that the type of the warning is "physical link breakdown (the fourth line in FIG. 3)". The prior rule for the interrelation analysis unit 20 in the case where the type is "physical link breakdown" is "a ripple warning "linkdown" is generated from a device that is a physical connection destination (the fourth line in FIG. 4)".

Thereafter, the warning information generation unit 10 receives a warning "EQP" from Host_A. The prior rule of the warning "EQP" is "a ripple warning "linkdown" is generated from a device that is a physical connection destination (the second line in FIG. 4)". Consequently, by referring to the network configuration DB 30, it is possible to relate the ripple warning "linkdown" already received and the warning "EQP" received from Host_A.

In this way, even when the order of the warning "EQP" and the warning "linkdown" is turned over depending on the communication situation of the network, it is possible to distinguish and relate the main-cause warning and the ripple warning generated in a ripple manner. In short, the warning information generation unit 10 may receive the main-cause warning and the ripple warning in any order. Further, even in the case of receiving only the ripple warnings, it is possible to relate the ripple warnings to each other.

As described above, the warning monitoring system according to the embodiment includes: a warning information generation unit 10 configured to receive a warning and a ripple warning generated due to the warning, each including a device name and sent by a device configuring a network, determine respective types of the warning and the ripple warning based on messages included in the warning and the ripple warning, and generate warning information in which the warning and the ripple warning are associated with the types; a network configuration DB 30 in which configuration information about the network is accumulated;

an interrelation analysis unit 20 including a prior rule that indicates a generation manner of the ripple warning different depending on the type, and configured to acquire specific connection destination information by searching the network configuration DB 30 by using target information defined by the prior rule and the device name as keys, and relate the warning and the ripple warning; and a warning structure DB 40 in which the relation information indicating the relation between the warning and the ripple warning is accumulated. Thereby, it is possible to distinguish the target warning to be coped with even when the operator does not have a high experiential skill. Further, it is possible to easily explain the ground of the distinction because of relating the target warning to be coped with and the ripple warning.

In the above embodiment, the warnings about the types of "device main body breakdown", "logical link breakdown" and "physical link breakdown" have been described. As for warnings about other types, it is possible to distinguish the warning necessary to be coped with from the other warnings, by appropriately setting prior rules. Further, as for two or more warnings, it is possible to relate those warnings by the above-mentioned directed graph, for example. Accordingly, it is possible to distinguish the target warning to be coped with from two or more warnings. The warning structure DB 40 may be excluded when the relation information is output to a display device (not illustrated) or a print device (not illustrated).

(Relating of Warnings across Layers in Network)

The relating of warnings is performed by applying a plurality of prior rules. Consequently, it is possible to relate warnings that are generated at different layers in a network.

Figure 7:
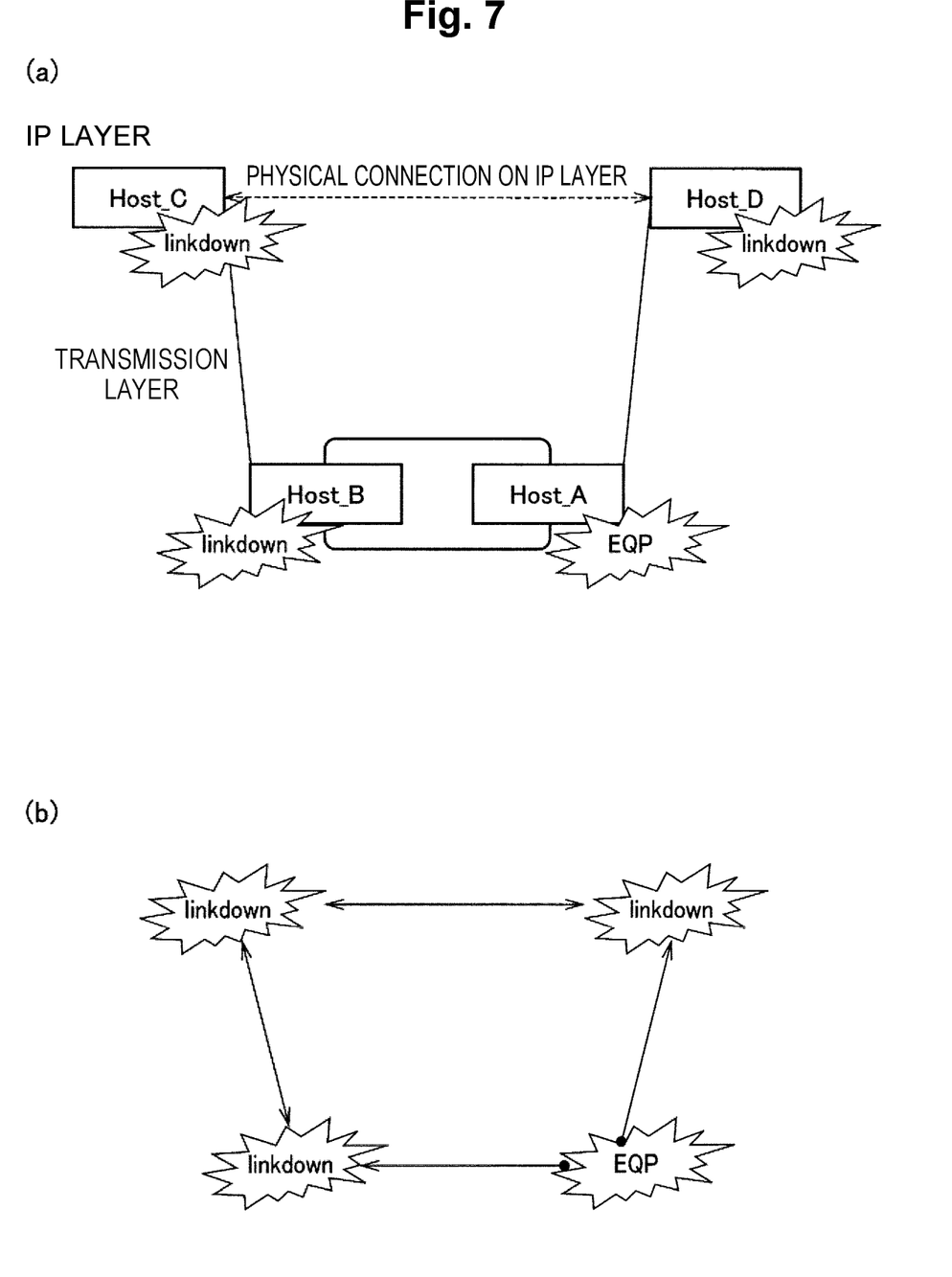
FIG. 7 is a diagram schematically showing a manner of a breakdown that occurs at different layers in a network.
Figure 8:
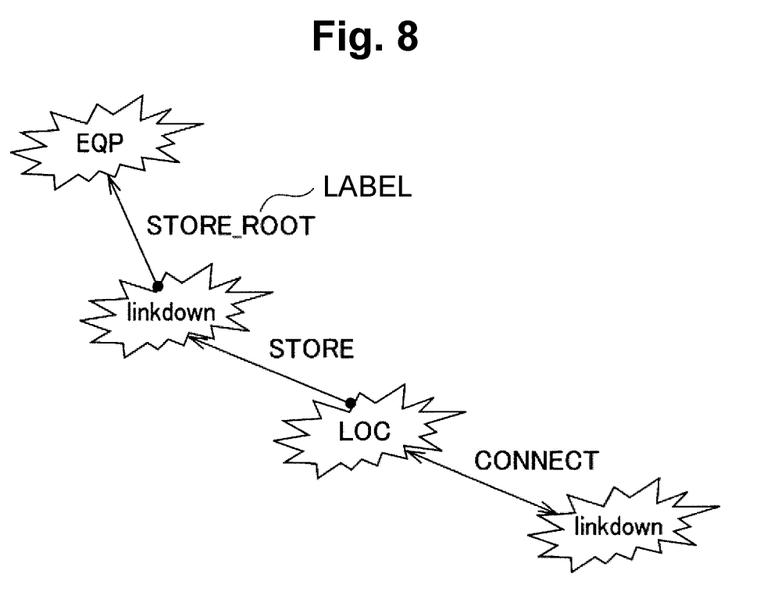
FIG. 8 is a diagram schematically showing label information written in the prior rule.

FIG. 7 is a diagram schematically showing an example in which warnings are generated across a network layer (IP layer) and a data link layer (transmission layer). Blocks shown in FIG. 7(a) express devices. Character strings written near the devices express warnings. An example is shown in which a warning "linkdown" is generated in each of Host_C and Host_D on the IP layer, a warning "linkdown" is generated in Host_B on the transmission layer, and a warning "EQP" is generated in Host_A on the same transmission layer.

In the case where the warnings are generated as shown in FIG. 7(a), in the warning monitoring system 100 according to the embodiment, it is possible to relate the warnings by a directed graph, through the above-explained behavior.

FIG. 7(b) is a diagram in which the warnings shown in FIG. 7(a) are related by a directed graph. It is possible to identify the main-cause warning by the directed graph connecting the nodes (warnings).

As shown in FIG. 7, the warning "EQP" is identified as the main-cause warning because there is no edge whose arrow is oriented to the warning EQP itself. Conversely, a node including an edge whose direction is oriented to the node itself is distinguished as the ripple warning.

In the method of relating warnings by a directed graph, it is not possible to perform the distinction between a main-cause warning and a ripple warning, before the orientation of the edge of each node becomes clear. Consequently, the distinction sometimes requires a long time.

As a method for shortening the time for the distinction, there can be a method in which a main cause is determined from attributes of relations. For example, label information expressing the relation between a ripple warning generated as a result and a warning causing the ripple warning is added in the prior rule. For the label information, the result may be related from the cause, or the cause may be related from the result.

For example, in the case where the warning "linkdown" explained in FIG. 2 is generated, label information "STORE ROOT" indicating that the warning "EQP" that generates the warning "linkdown" as a result is the main cause, for example, is added in the prior rule.

In addition, label information such as "STORE" indicating that there is a causal relation but the determination about the main cause is not performed, and "CONNET" indicating that there is a relation but there is no primary-secondary relation is added in the prior rule. By adding the label information in the prior rule, it is possible to identify the main-cause warning in accordance with the prior rule. That is, the warning and the ripple warning may be distinguished based on the label information. Thereby, it is possible to shorten the time required for the distinction between the main-cause warning and the ripple warning.

(Warning Monitoring Method)

Figure 9:
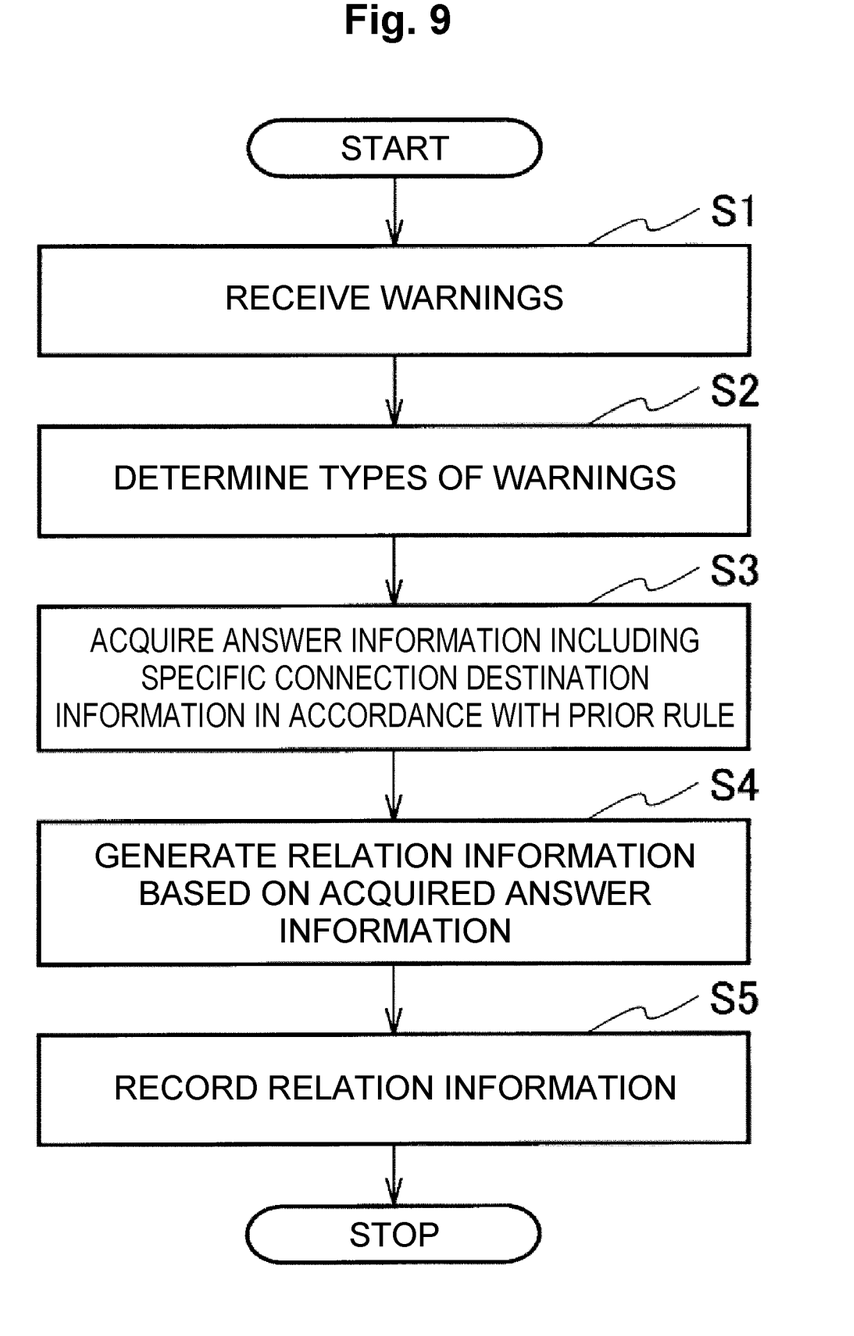
FIG. 9 is a diagram showing a flowchart showing a processing procedure of a warning monitoring method that is performed by the warning monitoring system shown in FIG. 1.

FIG. 9 is a flowchart showing a processing procedure of a warning monitoring method that is performed by the warning monitoring system 100 according to the embodiment.

The warning information generation unit 10 receives a warning and a ripple warning generated due to the warnings send by devices configuring a network, each including the device name for identifying the device, and a message expressing the type of the warning or the ripple warning (step S1).

Next, the warning information generation unit 10 recognizes the character strings in the received messages, and determines the types of the warnings (step S2). The type of the warning is determined as device main body breakdown, unit breakdown, physical link breakdown, logical link breakdown, or the like.

The interrelation analysis unit 20 includes a prior rule indicating a generation manner of the ripple warning different depending on the type of the warning, and acquires specific connection destination information by searching the network configuration DB 30 by using target information defined by the prior rule and the device name as keys (step S3). For example, in the case where the type of the warning information is "device main body breakdown", the prior rule is "a ripple warning "linkdown" is generated from a device that is a physical connection destination".

In this case, answer information (Host_b Port 1/2 linkdown) including the specific connection destination information is acquired by searching the network configuration DB 30 using Host_A and "physical connection destination" as keys (step S3).

Then, from the target information and the answer information, the interrelation analysis unit 20 generates the relation information in which the warning and the ripple warning are related (step S4).

The relation information is recorded in the warning information DB 40 (step S5). The relation information is expressed as the character string that is shown as "edge 1 . . . " in FIG. 2, for example.

Step S5 of recording the relation information may be skipped. Only the output of the generated relation information to the exterior (a display device or print device) may be performed.

Figure 10:
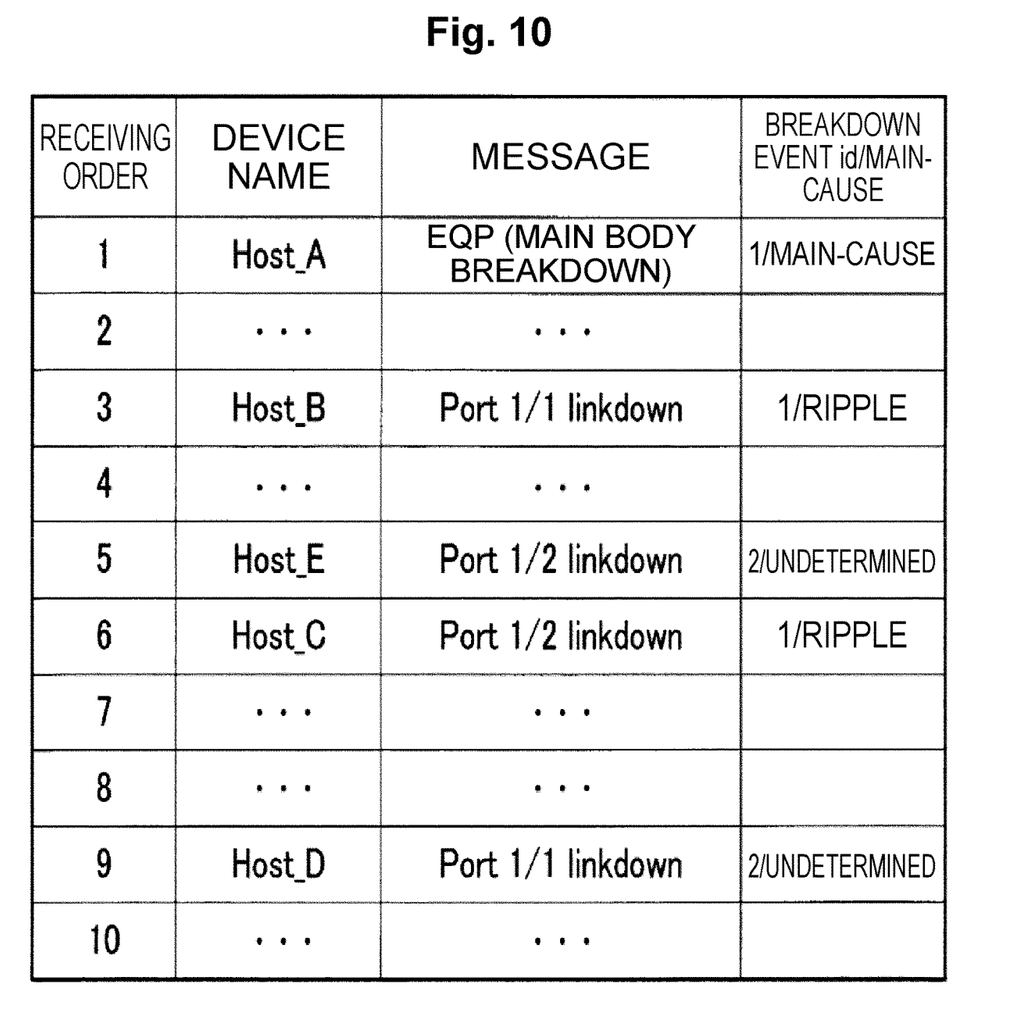
FIG. 10 is a diagram showing an example in which relation information is generated by the warning monitoring method shown in FIG. 9.

FIG. 10 is a diagram showing an example in which the relation information is generated by the warning monitoring method in the embodiment. The first column from the left in FIG. 10 indicates receiving order, the second column and the third column indicate the warning, and the fourth column indicates the relation information. Although the description of the network configuration is omitted, this example shows a case where Host_A, Host_B and Host_C are connected by a communication line and where Host_C and Host_D are connected by only a control line.

Assuming that warnings are generated in the receiving order shown in FIG. 10, warnings generated from devices connected by the communication line are distinguished between the main-cause warning and the ripple warning. In FIG. 10, "1/" of "1/main-cause" on the second line from the top is an ID (identifier) that is assigned to a group of warnings.

In FIG. 10, "1/ripple" on the fourth line and the fifth line indicate that the warning is a ripple warning generated due to the warning "1/main-cause". By referring to the relation information (FIG. 10), the operator can easily distinguish the main-cause warning and the ripple warning generated due to the warning.

As described above, the warning monitoring method according to the embodiment is a warning monitoring method that is performed by the warning monitoring system 100, the warning monitoring method including: a warning information generation step (S1 and S2) of receiving a warning and a ripple warning generated due to the warning, each including a device name and sent by a device configuring a network, determining respective types of the warning and the ripple warning based on messages included in the warning and the ripple warning, and generating warning information in which the warning and the ripple warning are associated with the types; and an interrelation analysis step (S3 and S4) of including a prior rule that indicates a generation manner of the ripple warning different depending on the type, acquiring specific connection destination information by searching a network configuration DB in which configuration information about the network is accumulated, by using target information defined by the prior rule and the device name as keys, and relating the warning and the ripple warning. Thereby, it is possible to accurately distinguish the target warning to be coped with and the ripple warning that does not need to be coped with, even when the operator monitoring the network does not have a high skill.

Figure 11:
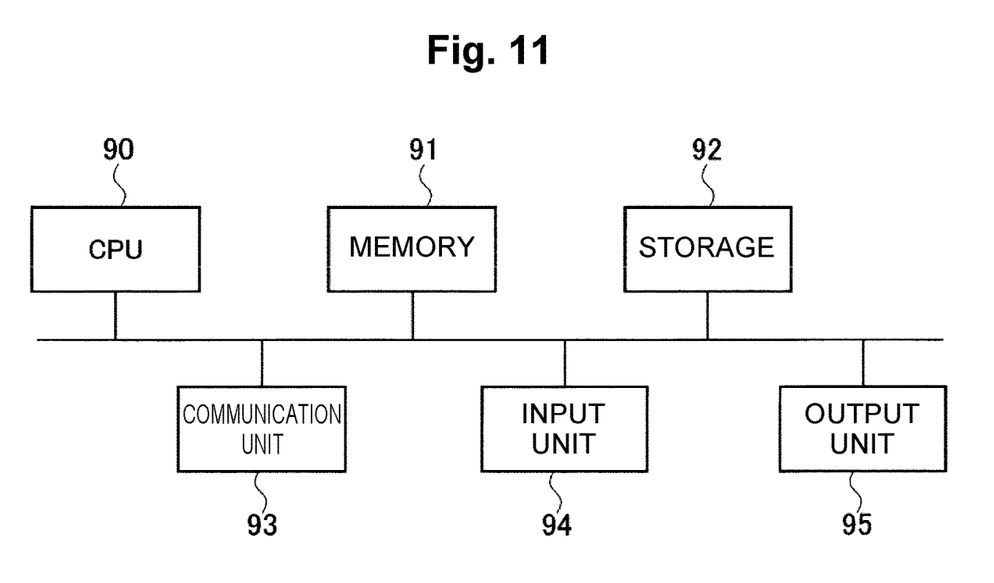
FIG. 11 is a block diagram showing an exemplary configuration of a general-purpose computer system.

The warning monitoring system 100 can be realized by a general-purpose computer system shown in FIG. 11. For example, in a general-purpose computer system including a CPU 90, a memory 91, a storage 92, a communication unit 93, an input unit 94 and an output unit 95, the CPU 90 executes a predetermined program loaded on the memory 91, so that each function of the warning monitoring system 100 is realized. The predetermined program can be recorded in a computer-readable recording medium such as an HDD, an SSD, a USB memory, a CD-ROM, a DVD-ROM and an MO, or can be delivered through a network. The respective functional units of the warning monitoring system 100 may be configured in a computer system (server).

The present invention is not limited to the above embodiment, and modifications can be made within the scope of the spirit of the invention. For example, the example in which the warning information generation unit 10 receives the warnings and generates the warning information has been explained, but the present invention is not limited to this example. The receiving and the warning information generation may be configured such that the respective actions are separated. Further, the data format of the network configuration DB 30 is not limited to the above example. For example, the network configuration DB 30 may be a relational DB or a graph DB. Further, as a protocol for receiving the warning, any protocol can be adopted as long as the warning information generation unit 10 can transfer structured data in which the warning information is associated with the type, to the interrelation analysis unit 20.

Thus, naturally, the present invention includes various embodiments and the like that are not described herein. Accordingly, the technical scope of the present invention is determined by only matters specifying the invention according to the claims that are reasonable from the above explanation.

REFERENCE SIGNS LIST

10 Warning information generation unit
20 Interrelation analysis unit
30 Network configuration database
40 Warning structure database
100 Warning monitoring system

The invention claimed is:

1. A warning monitoring system comprising:
   a warning information generation unit, including one or more processors, configured to receive a warning and a ripple warning generated due to the warning, each including a device name and sent by a device configuring a network, determine respective types of the warning and the ripple warning based on messages included in the warning and the ripple warning, and generate warning information in which the warning and the ripple warning are associated with the types;
   a network configuration database in which configuration information about the network is accumulated; and
   an interrelation analysis unit including a prior rule that indicates a generation manner of the ripple warning different depending on the type, and including one or more processors configured to acquire specific connection destination information by searching the network configuration database by using target information defined by the prior rule and the device name as keys, and relate the warning and the ripple warning.

2. The warning monitoring system according to claim 1, wherein the relation information is expressed as nodes expressing the warning and the ripple warning respectively and an edge connecting the nodes with each other.

3. The warning monitoring system according to claim 1, wherein the prior rule includes label information indicating a relation between the warning and the ripple warning, and the relation is distinguished based on the label information.

4. The warning monitoring system according to claim 2, wherein the node including the edge whose direction is oriented to the node itself is distinguished as the ripple warning.

5. A warning monitoring method that is performed by a warning monitoring system, the warning monitoring method comprising:
   receiving a warning and a ripple warning generated due to the warning, each including a device name and sent by a device configuring a network, determining respective types of the warning and the ripple warning based on messages included in the warning and the ripple warning, and generating warning information in which the warning and the ripple warning are associated with the types; and
   including a prior rule that indicates a generation manner of the ripple warning different depending on the type, acquiring specific connection destination information by searching a network configuration database in which configuration information about the network is accumulated, by using target information defined by the prior rule and the device name as keys, and relating the warning and the ripple warning.

6. A non-transitory computer readable medium storing one or more instructions that cause a computer to function as a warning monitoring system to execute:

receiving a warning and a ripple warning generated due to the warning, each including a device name and sent by a device configuring a network, determining respective types of the warning and the ripple warning based on messages included in the warning and the ripple warning, and generating warning information in which the warning and the ripple warning are associated with the types; and including a prior rule that indicates a generation manner of the ripple warning different depending on the type, acquiring specific connection destination information by searching a network configuration database in which configuration information about the network is accumulated, by using target information defined by the prior rule and the device name as keys, and relating the warning and the ripple warning.

7. The warning monitoring method according to claim 5, wherein the relation information is expressed as nodes expressing the warning and the ripple warning respectively and an edge connecting the nodes with each other.

8. The warning monitoring method according to claim 7, wherein the node including the edge whose direction is oriented to the node itself is distinguished as the ripple warning.

9. The warning monitoring method according to claim 5, wherein the prior rule includes label information indicating a relation between the warning and the ripple warning, and the relation is distinguished based on the label information.

10. The non-transitory computer readable medium according to claim 6, wherein the relation information is expressed as nodes expressing the warning and the ripple warning respectively and an edge connecting the nodes with each other.

11. The non-transitory computer readable medium according to claim 10, wherein the node including the edge whose direction is oriented to the node itself is distinguished as the ripple warning.

12. The non-transitory computer readable medium according to claim 6, wherein the prior rule includes label information indicating a relation between the warning and the ripple warning, and the relation is distinguished based on the label information.

\* \* \* \* \*